US012771773B2

(12) United States Patent
Xu

(10) Patent No.: US 12,771,773 B2
(45) Date of Patent: Oct. 20, 2026

(54) MULTIFUNCTIONAL MOBILE TERMINAL SHELL

(71) Applicant: Ziming Xu, Foshan (CN)

(72) Inventor: Ziming Xu, Foshan (CN)

( * ) Notice: Subject to any disclaimer, the term of this patent is extended or adjusted under 35 U.S.C. 154(b) by 200 days.

(21) Appl. No.: 18/818,874

(22) Filed: Aug. 29, 2024

(65) Prior Publication Data

US 2024/0422254 A1 Dec. 19, 2024

(30) Foreign Application Priority Data

Aug. 16, 2024 (CN) ........................ 202421925530.2

(51) Int. Cl.
*H04M 1/04* (2006.01)
*A45C 11/18* (2006.01)

(52) U.S. Cl.
CPC ............ *H04M 1/04* (2013.01); *A45C 11/182* (2013.01); *H04M 2250/52* (2013.01)

(58) Field of Classification Search
CPC .. H04M 1/04; H04M 1/0264; H04M 2250/52; A45C 11/182
See application file for complete search history.

(56) References Cited

U.S. PATENT DOCUMENTS 8,833,379 B1 * 9/2014 Kaplan ................ A45D 33/26 206/823
10,256,860 B2 * 4/2019 Chung ................ A45C 11/182
11,771,190 B1 * 10/2023 Yoon .................. A45C 11/002 455/575.8
D1,093,364 S * 9/2025 Zeng .......................... D14/250
12,471,694 B2 * 11/2025 Zhang ................ A45C 11/182
D1,105,047 S * 12/2025 Xu ................................ D3/218
2014/0228082 A1 * 8/2014 Morrow .............. H04B 1/3888 455/575.8
2015/0334212 A1 * 11/2015 Sandu .................... H04M 1/21 455/575.1

(Continued)

OTHER PUBLICATIONS

Vihbii, Vihibii for Samsung Galaxy Z Fold 5 Case with Card Holder & Slide Camera Cover & Hinge Protection & Screen Protector, Heavy Duty Rugged Wallet Phone Case for Samsung Galaxy Z Fold 5 5G 2023, Black, Aug. 23, 2023, Amazon (Year: 2023).*

(Continued)

*Primary Examiner* — Patrick F Marinelli
(74) *Attorney, Agent, or Firm* — Hemisphere Law, PLLC

(57) ABSTRACT

The present disclosure provides a multifunctional mobile terminal shell. The shell includes a main body portion that is matched with one surface of a mobile terminal provided with a camera; a first holder assembly, arranged at one end of the main body portion and including a camera holder assembly and a first connecting assembly arranged at one end of the camera holder assembly, wherein the first connecting assembly is arranged on the main body portion and is hinged to the camera holder assembly; and a second holder assembly, spaced apart from the first holder assembly and including a card bag cover plate and a second connecting assembly arranged at one end of the card bag cover plate, wherein the second connecting assembly is arranged on the main body portion and is hinged to the card bag cover plate.

5 Claims, 13 Drawing Sheets

(56) References Cited

U.S. PATENT DOCUMENTS

| | | | | |
|---|---|---|---|---|
| 2016/0014922 | A1* | 1/2016 | Banerjee | A45C 7/0031 206/38 |
| 2016/0088912 | A1* | 3/2016 | Lawson | A45C 13/008 206/38 |
| 2016/0206065 | A1* | 7/2016 | Ehrlich | H04B 1/3888 |
| 2016/0374443 | A1* | 12/2016 | Kim | A45C 11/182 206/38 |
| 2017/0265314 | A1 | 9/2017 | Yao et al. | |
| 2018/0191395 | A1* | 7/2018 | Chung | H04B 1/3888 |
| 2020/0099413 | A1 | 3/2020 | Kim | |
| 2023/0097278 | A1 | 3/2023 | Storey et al. | |
| 2023/0244124 | A1* | 8/2023 | Bos | G03B 15/05 362/319 |
| 2023/0329405 | A1* | 10/2023 | Yoon | A45C 11/002 |
| 2024/0422254 | A1* | 12/2024 | Xu | A45C 11/182 |
| 2025/0221518 | A1* | 7/2025 | Zhang | A45F 5/1516 |

OTHER PUBLICATIONS

ATATOO, ATATOO for iPhone 17e & 16e Wallet Case, Built-in Card Holder (3-5 Cards) & Slide Camera Cover & RFID Blocking, Military Grade Protection, Rugged Shockproof Phone Case for iPhone 17e/16e 6.1, Blue, Jun. 7, 2024, Amazon (Year: 2024).*

* cited by examiner

MULTIFUNCTIONAL MOBILE TERMINAL SHELL

TECHNICAL FIELD

The present disclosure relates to the technical field of mobile terminals, and in particular to, a multifunctional mobile terminal shell.

BACKGROUND

With the improvement of the material life, playing with tablets, mobile phones, and the like has become a trendy way of life. Mobile terminals such as the tablets and the mobile phones are very convenient to carry, but there is a shortcoming that they do not have a fixed supporting point, so that it is very inconvenient to watch videos if the tablets, the mobile terminal, or the like are placed on tables. To address this issue, some companies produce mobile phone holders that are stuck to a back shell of mobile terminals. When a mobile terminal needs to be supported, the mobile terminal can be supported on a table if the mobile phone holder is opened.

The inventor of the present disclosure has found in long-term research and development that existing holder products on the market are small. Due to shifting of the center of gravity, when a user watches a video using a holder for supporting a mobile terminal, the holder easily falls down, so that the user experience is poor.

SUMMARY

The present disclosure provides a multifunctional mobile terminal shell, to solve the problem that when a holder for supporting a mobile phone is used during watching videos, the holder easily falls down due to shifting.

To solve the above technical problem, the present disclosure uses a technical solution: A multifunctional mobile terminal shell is provided. The shell includes:

- a main body portion, matched with one surface of the mobile terminal provided with a camera;
- a first holder assembly, arranged at one end of the main body portion and including a camera holder assembly and a first connecting assembly arranged at one end of the camera holder assembly, wherein the first connecting assembly is arranged on the main body portion and is hinged to the camera holder assembly; and
- a second holder assembly, spaced apart from the first holder assembly and including a card bag cover plate and a second connecting assembly arranged at one end of the card bag cover plate, wherein the second connecting assembly is arranged on the main body portion and is hinged to the card bag cover plate.

In a specific embodiment, the camera holder assembly includes a first cover plate, a second cover plate, and sliding rails; one end of the first cover plate is connected to the first connecting assembly; the first cover plate is provided with a first opening matched with the camera of the mobile terminal; the sliding rails are arranged at an edge of one side of the first cover plate facing away from the main body portion; sliding blocks matched with the sliding rails are arranged at two ends of the second cover plate; and the second cover plate is matched with the first opening.

In a specific embodiment, the main body portion is provided with a second opening and a first ring slot; the second opening is matched with the camera of the mobile terminal and the first opening; and the first ring slot is arranged outside the second opening and corresponds to the first cover plate.

In a specific embodiment, the camera holder assembly includes a group of sliding rails arranged at upper and lower edges of the first cover plate; the sliding blocks matched with the sliding rails are arranged at upper and lower ends of the second cover plate; the first connecting assembly is arranged on a right side of the first cover plate; a first buckle is arranged on a left side of the first cover plate; and the first ring slot is provided with a first buckle slot matched with the first buckle.

In a specific embodiment, the first connecting assembly includes a first hinge, a second hinge hinged to the first hinge, and two needle portions, each of which is provided with a texture at one end; the first hinge is provided with a first threading portion; the second hinge is provided with a second threading portion matched with the first hinge; gears are arranged on the first threading portion and the second threading portion; one of the first hinge and the second hinge is connected to the main body portion; and the other one of the first hinge and the second hinge is connected to the first cover plate.

In a specific embodiment, the main body portion is provided with a second ring slot configured to accommodate a card; and the card bag cover plate is matched with the second ring slot.

In a specific embodiment, a second buckle is arranged at one end of the card bag cover plate, and the other end of the card bag cover plate is connected to the second connecting assembly; and a second buckle slot matched with the second buckle is provided on the second ring slot.

In a specific embodiment, the second connecting assembly includes a first hinge, a second hinge hinged to the first hinge, and two needle portions, each of which is provided with a texture at one end; the first hinge is provided with a first threading portion; the second hinge is provided with a second threading portion matched with the first hinge; gears are arranged on the first threading portion and the second threading portion; one of the first hinge and the second hinge is connected to the main body portion; and the other one of the first hinge and the second hinge is connected to the card bag cover plate.

In a specific embodiment, the second connecting assembly further includes a limiting sleeve; the limiting sleeve is arranged in the first threading portion or the second threading portion in a penetrating manner to connect the other ends of the two needle portions.

In a specific embodiment, a material of the first hinge and the second hinge is zinc alloy.

The present disclosure has the beneficial effects that: According to a difference from the prior art, the present disclosure provides a multifunctional mobile terminal shell. The shell includes a main body portion that is matched with one surface of a mobile terminal provided with a camera; a first holder assembly, arranged at one end of the main body portion and including a camera holder assembly and a first connecting assembly arranged at one end of the camera holder assembly, wherein the first connecting assembly is arranged on the main body portion and is hinged to the camera holder assembly; and a second holder assembly, spaced apart from the first holder assembly and including a card bag cover plate and a second connecting assembly arranged at one end of the card bag cover plate, wherein the second connecting assembly is arranged on the main body portion and is hinged to the card bag cover plate. By the arrangement of the first holder assembly and the second holder assembly on the main body portion of the shell placed at the back of a mobile terminal, adjusting an angle between the camera holder assembly and/or the card bag cover plate and the main body portion can achieve a supporting effect of a mobile phone holder. A force-bearing area is large, and there can be two supporting points, so that the center of gravity of the mobile terminal will not shift, and the supporting force is more sufficient, which greatly enhances the user experience.

BRIEF DESCRIPTION OF THE DRAWINGS

For clearer descriptions of the technical solutions according to the embodiments of the present disclosure, the drawings required to be used in the description of the embodiments are briefly introduced below. It is obvious that the drawings in the description below are only some embodiments of the present disclosure, and it is obvious for those skilled in the art that other drawings can be acquired according to the drawings without creative efforts.

DETAILED DESCRIPTION OF THE EMBODIMENTS

The technical solutions in embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without making creative efforts shall fall within the protection scope of the present disclosure.

It should be noted that if there are directional indications (such as up, down, left, right, front, back . . . ) involved in the embodiments of the present disclosure, the directional indications are only used to explain the relative positional relationship, motion states, and the like between various components in specific postures (as shown in the accompanying drawings). If the specific postures change, the directional indications also change correspondingly.

In addition, if there are descriptions related to “first”, “second”, and the like in the embodiments of the present disclosure, the descriptions of “first”, “second”, and the like are only used for descriptive purposes and cannot be understood as indicating or implying their relative importance or implying the quantities of indicated technical features. From this, features defined as “first” and “second” may explicitly or implicitly include at least one feature.

In addition, the technical solutions between the various embodiments can be combined with each other, but need to be implemented by those of ordinary skill in the art. When there is a conflict in a combination of technical solutions or the combination cannot be achieved, it should be considered that the combination of the technical solutions does not exist and does not fall within the protection scope of the present disclosure.

Figure 1:
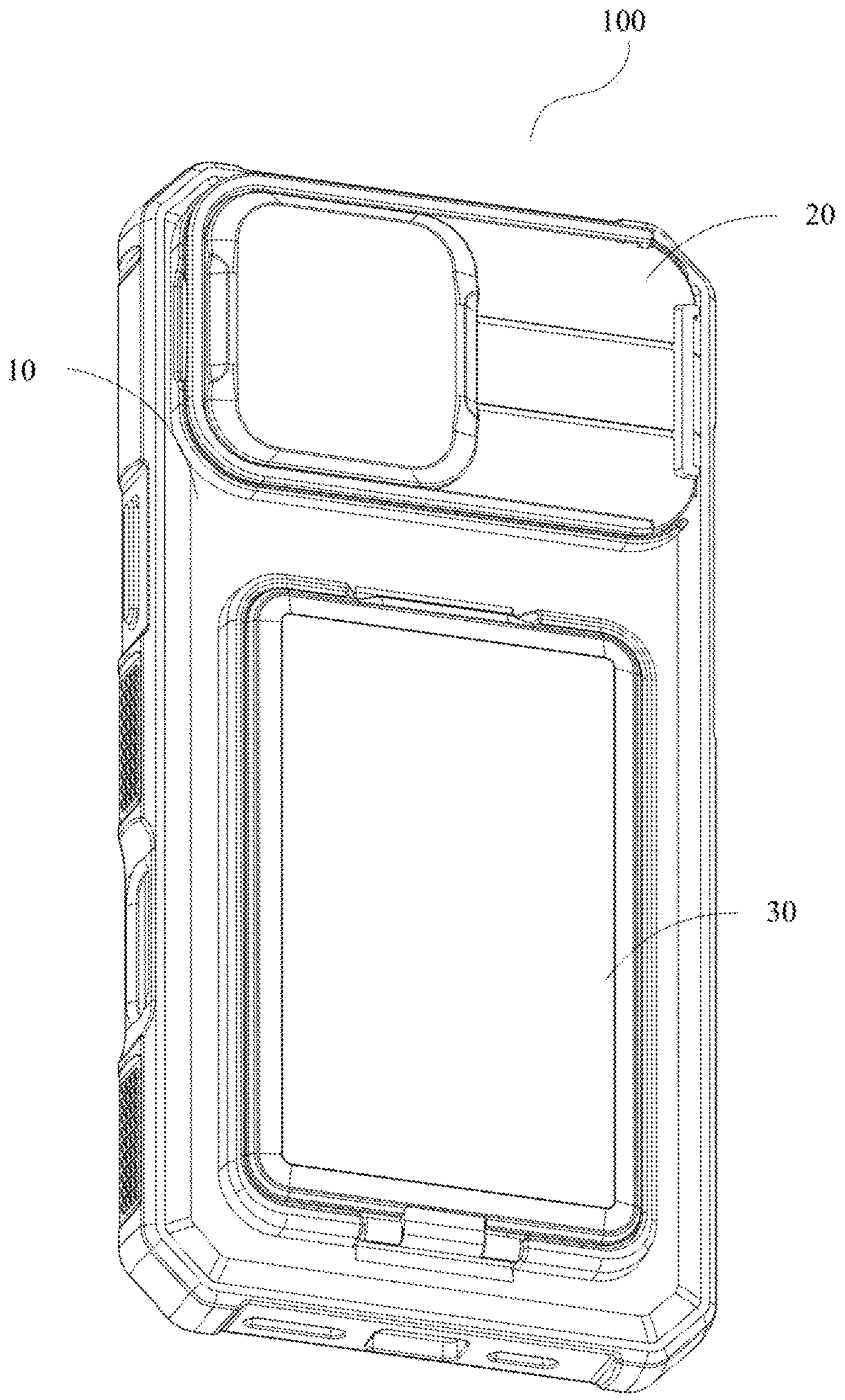
FIG. 1 is a schematic structural diagram of an embodiment of a multifunctional mobile terminal shell according to the present disclosure.
Figure 2:
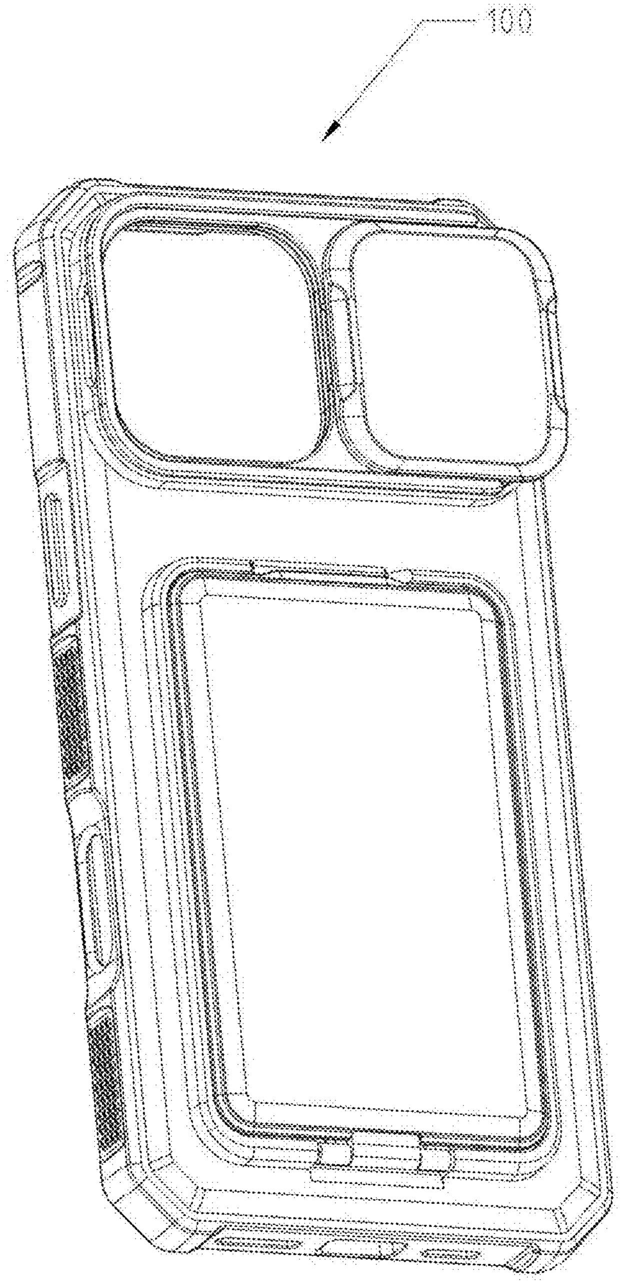
FIG. 2 is a schematic structural diagram of an embodiment of a second cover plate in an opened state in FIG. 1.
Figure 3:
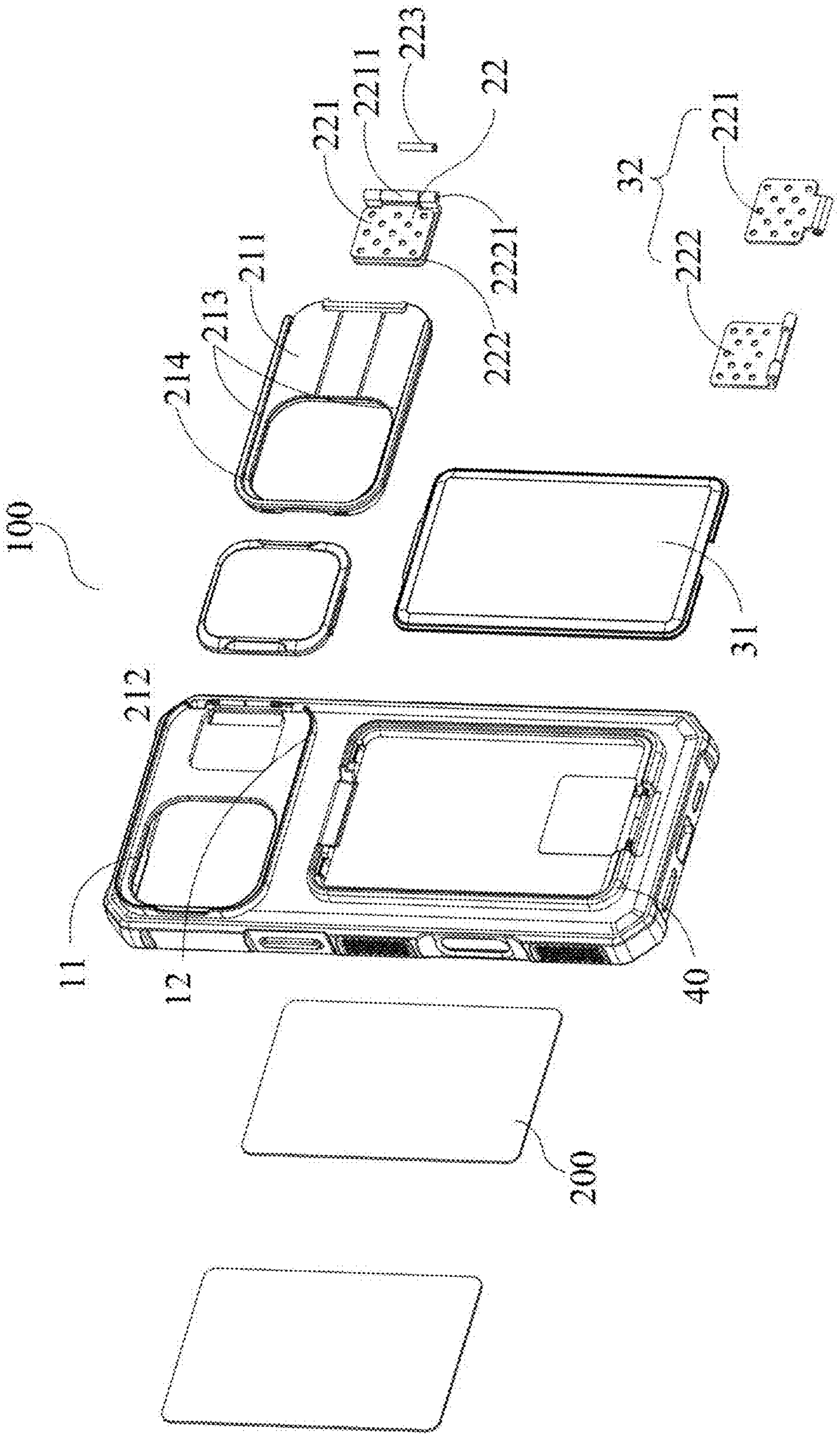
FIG. 3 is a schematic diagram of a split structure of an embodiment of a multifunctional mobile terminal shell as shown in FIG. 1.
Figure 4:
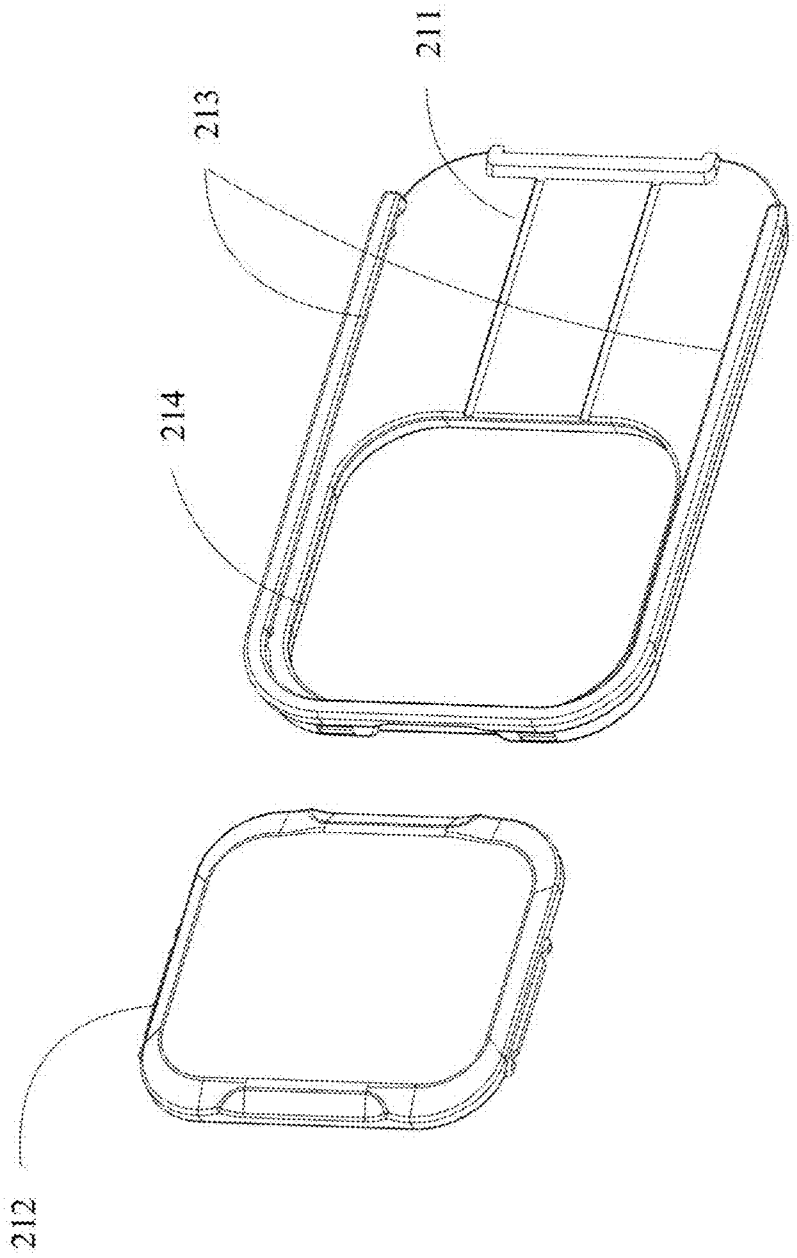
FIG. 4 is a schematic structural diagram of an embodiment of a camera holder assembly in FIG. 3.

Referring to FIG. 1 to FIG. 3, FIG. 1 is a schematic structural diagram of an embodiment of a multifunctional mobile terminal shell according to the present disclosure; FIG. 2 is a schematic structural diagram of an embodiment of a second cover plate in an opened state in FIG. 1; and FIG. 3 is a schematic diagram of a split structure of an embodiment of a multifunctional mobile terminal shell as shown in FIG. 1. This embodiment discloses a multifunctional mobile terminal shell 100. The shell 100 includes a main body portion 10, a first holder assembly 20, and a second holder assembly 30.

Specifically, the main body portion 10 is matched with one surface of the mobile terminal provided with a camera, for example, an external shell of the mobile terminal. The first holder assembly 20 is arranged at one end of the main body portion 10 and includes a camera holder assembly 21 and a first connecting assembly 22 arranged at one end of the camera holder assembly 21. The first connecting assembly 22 is arranged on the main body portion 10 and is hinged to the camera holder assembly 21.

The second holder assembly 30 is spaced apart from the first holder assembly 20 and includes a card bag cover plate 31 and a second connecting assembly 32 arranged at one end of the card bag cover plate 31. The second connecting assembly 32 is arranged on the main body portion 10 and is hinged to the card bag cover plate 31.

In a specific embodiment, the camera holder assembly 21 includes a first cover plate 211, a second cover plate 212, and sliding rails 213; one end of the first cover plate 211 is connected to the first connecting assembly 22; and the first cover plate 212 is provided with a first opening 214 matched with the camera of the mobile terminal. The sliding rails 213 are arranged at an edge of one side of the first cover plate 211 facing away from the main body portion 10. Sliding blocks (not shown) matched with the sliding rails 213 are arranged at two ends of the second cover plate 212; and the second cover plate 211 is matched with the first opening 214. In a specific embodiment, the main body portion 10 is provided with a second opening 11 and a first ring slot 12; the second opening 11 is matched with the camera of the mobile terminal and the first opening 214. The first ring slot 12 is arranged outside the second opening 11 and corresponds to the first cover plate 211.

In a specific embodiment, the camera holder assembly 21 includes a group of sliding rails 213 arranged at upper and lower edges of the first cover plate 211; and the sliding blocks matched with the sliding rails 213 are arranged at upper and lower ends of the second cover plate 211. The first connecting assembly 22 is arranged on a right side of the first cover plate 211. A first buckle (not shown) is arranged on a left side of the first cover plate 211; and the first ring slot 12 is provided with a first buckle slot (not shown) matched with the first buckle.

In a specific embodiment, the second connecting assembly 22 includes a first hinge 221, a second hinge 222 (as shown in FIG. 3, the first hinge 221 is located at the upper part, and the second hinge 222 is located at the lower part) hinged to the first hinge 221, and two needle portions (not shown), each of which is provided with a texture at one end; the first hinge 221 is provided with a first threading portion 2211; the second hinge 222 is provided with a second threading portion 2221 matched with the first hinge 221; and gears are arranged on the first threading portion 2211 and the second threading portion 2221. One of the first hinge 221 and the second hinge 222 is connected to the main body portion 10; and the other one of the first hinge and the second hinge is connected to the card bag cover plate 211.

Figure 5:
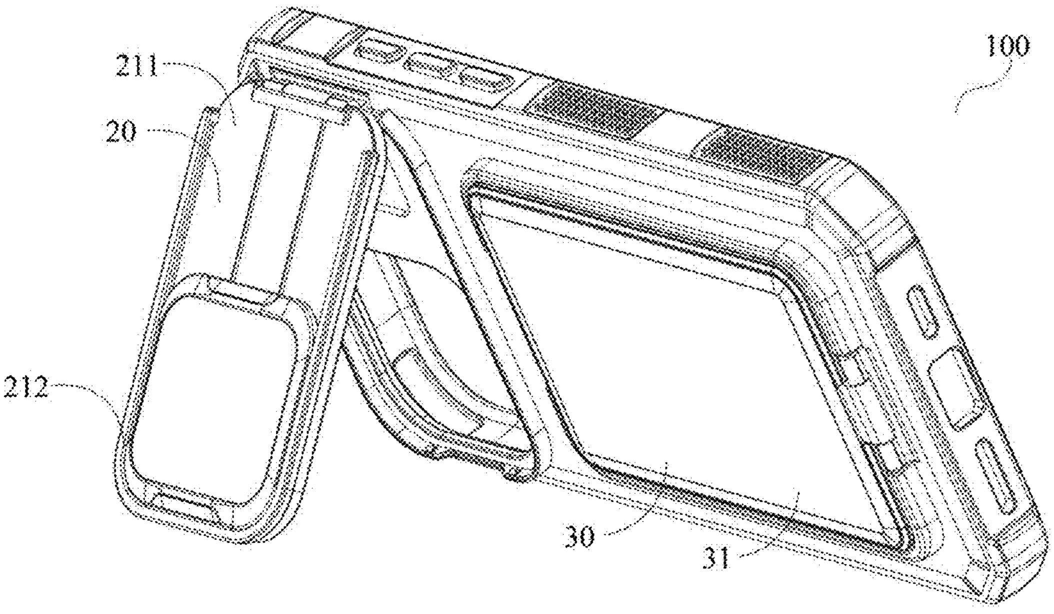
FIG. 5 is a front view of an embodiment of a state where the camera holder assembly is opened and used as a mobile phone holder in FIG. 3.
Figure 6:
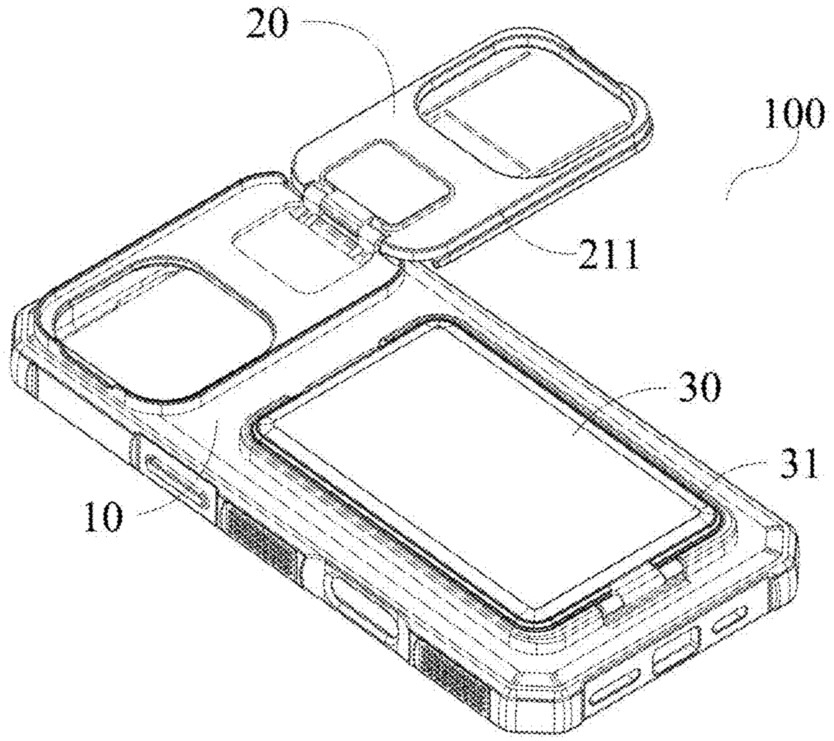
FIG. 6 is a front view of a state where the camera holder assembly is opened 180° in FIG. 3.
Figure 7:
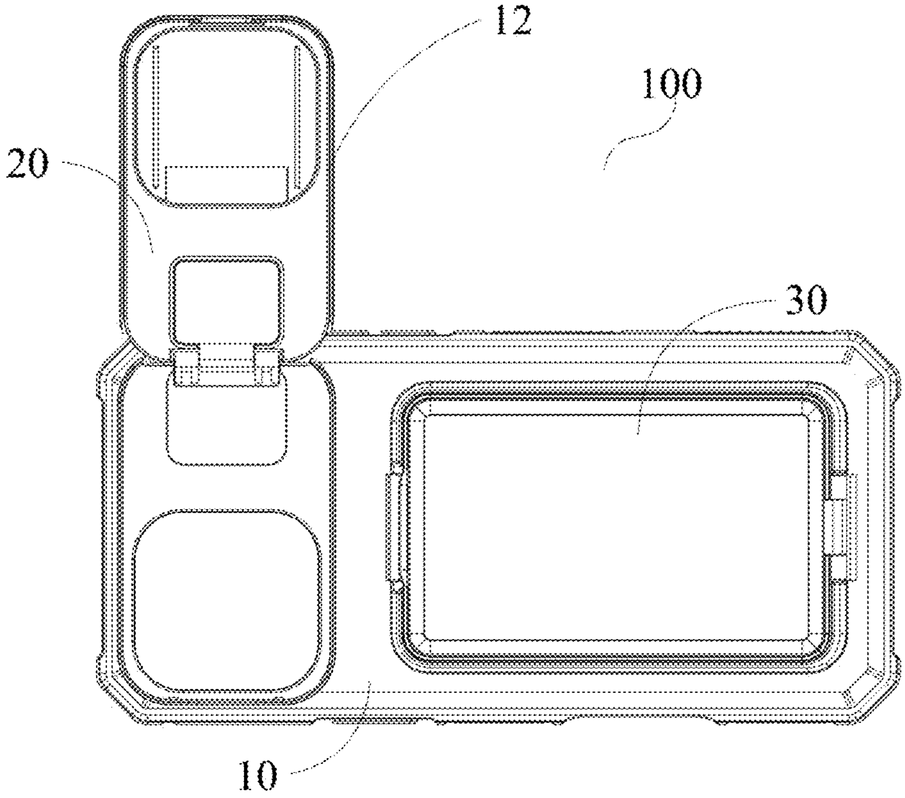
FIG. 7 is a front view of a state where the camera holder assembly is opened 180° in FIG. 3.

Referring to FIG. 4 to FIG. 7, FIG. 4 is a schematic structural diagram of an embodiment of a camera holder assembly in FIG. 3; FIG. 5 is a front view of an embodiment of a state where the camera holder assembly is opened and used as a mobile phone holder in FIG. 3; FIG. 6 is a front view of a state where the camera holder assembly is opened 180° in FIG. 3; and FIG. 7 is a front view of a state where the camera holder assembly is opened 180° in FIG. 3.

In a specific embodiment, when the main body portion 10 is a mobile phone shell, the second cover plate 212 can protect a rear camera of the mobile phone, achieving anti-falling and dustproof effects. When the first cover plate 211 is opened, it can be used as a mobile phone holder to watch audios and videos and free up hands. When the first connecting assembly 22 is rotated through the two needle portions to 180°, it is extended and held in a hand as a selfie handle, so that a picture taking angle can be randomly switched. Therefore, this product has a selfie stick, but a user does not need to carry a selfie stick. The second cover plate 212 is equivalent to a camera holder sliding window. Currently, a camera holder on the market is small. When the camera holder is used as a mobile phone holder, its holding power is insufficient, and the stability is poor. In the multi-functional mobile terminal shell 100 of the present disclosure, the illustrated direction is taken as an example. When the second cover plate 212 is on the left side, it is equivalent to closing the window and covering the camera. Opening the window by sliding along the slide rails 213 from left to right can expose the camera to take pictures and videos. After use, the window is closed by sliding along the slide rails from right to left. A material of the two hinges of the first connecting assembly 22 on the right side can be a zinc alloy damping material. In this design, the holding power is more sufficient.

In this embodiment, the first hinge 221 on the left side and the second hinge 222 on the right side are explained. A concave-convex buckle slot is designed on the left side to make buckling tight, and a zinc alloy damping hinge is arranged on the right side. The first hinge 221 on the left side is welded and fixed on the main body portion 10 through a hot melting process. The second hinge 222 that is the zinc alloy damping hinge is on the right side. The textures are respectively provided at the end portions of the two stainless steel needles for fixing. After the threading portions of the two hinges are aligned and assembled, rubber sleeves 223 can be arranged in the threading portions. Smooth ends of the two stainless steel needles are threaded from the threading portions and enter the rubber sleeves 223, which can achieve antislip and limiting effects, and it is hard for separation. In addition, gears can be provided in the threading portions, so that the two hinges drive the first cover plate 211 and the main body portion 10 to be opened and closed, making pushing and pulling more textured. Stepless angle adjustment can be achieved. This product has higher quality and longer service life than an original product on the market.

Figure 8:
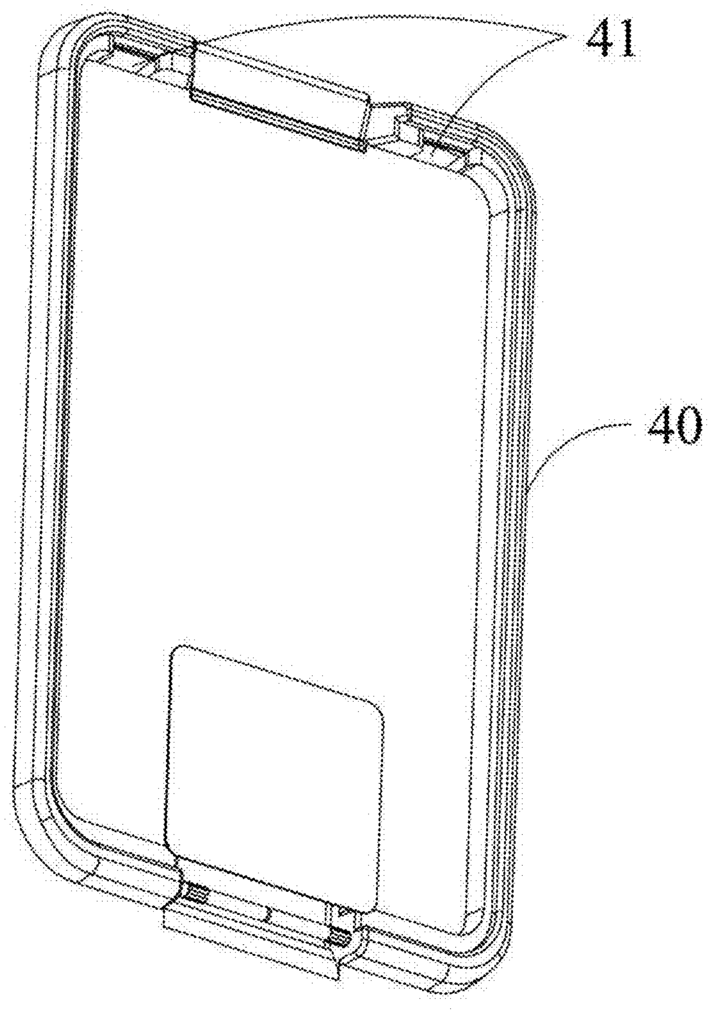
FIG. 8 is a schematic structural diagram of an embodiment of a second ring slot in FIG. 3.
Figure 9:
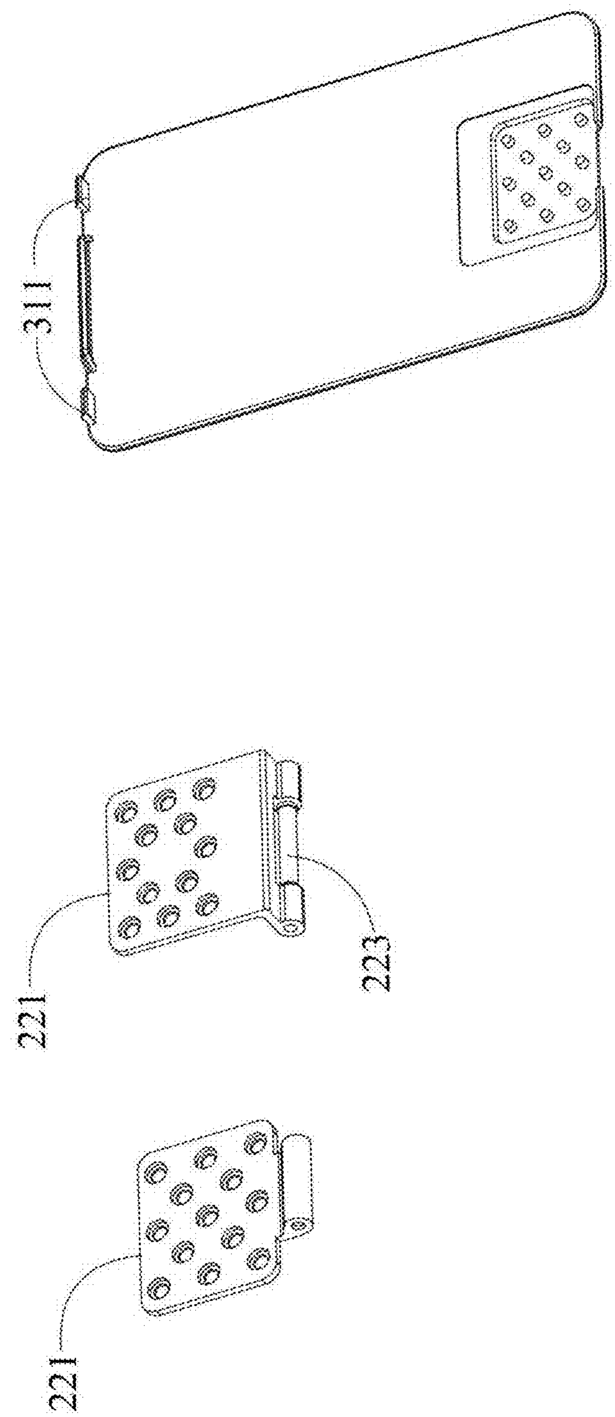
FIG. 9 is a schematic structural diagram of a second connecting assembly and a card bag cover plate in FIG. 3.
Figure 10:
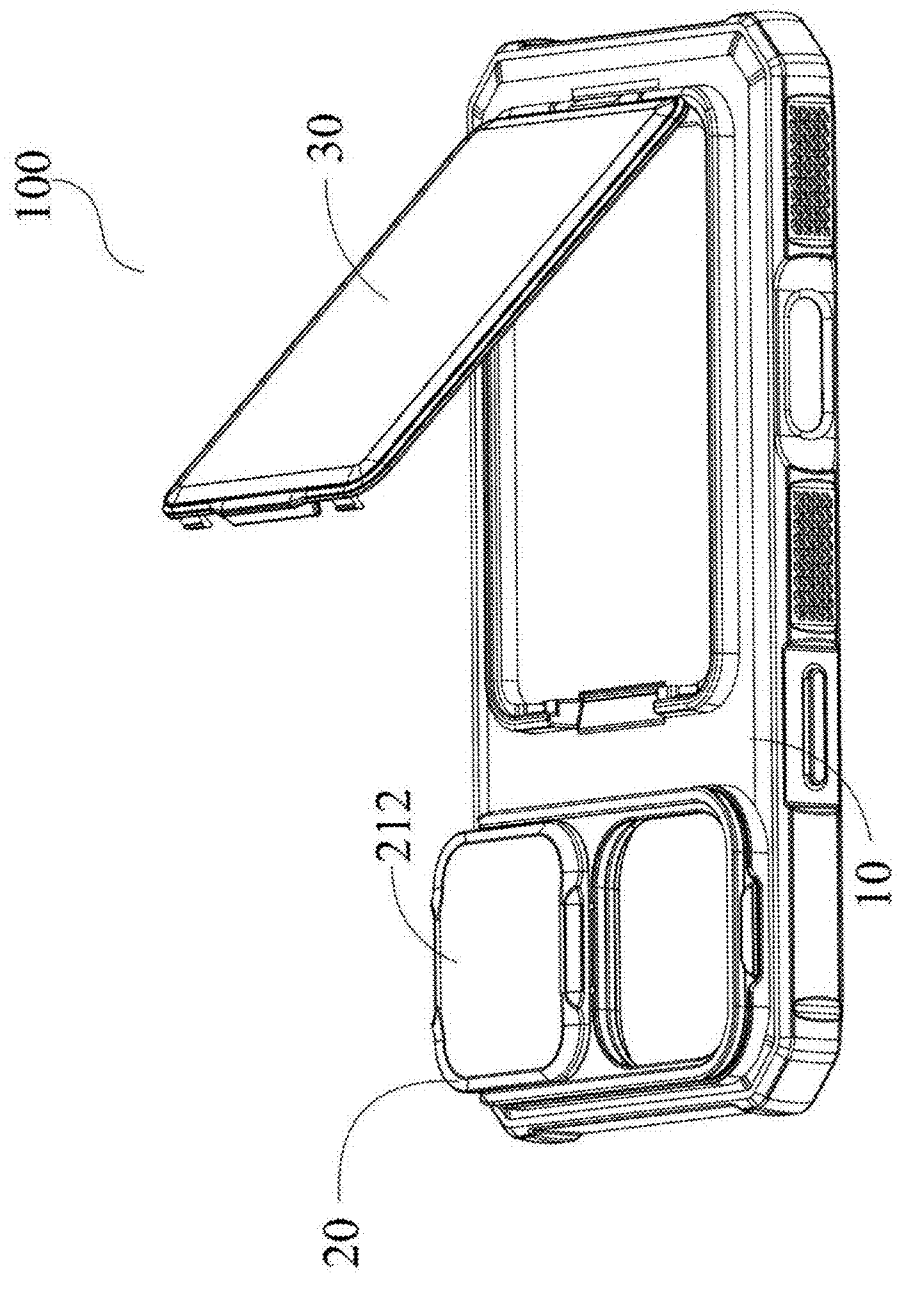
FIG. 10 is a front view of an embodiment of a state where the card bag cover plate is opened and used as a mobile phone holder in FIG. 3.

Referring to FIG. 8 to FIG. 9, FIG. 8 is a schematic structural diagram of an embodiment of a second ring slot in FIG. 3; and FIG. 9 is a schematic structural diagram of a second connecting assembly and a card bag cover plate in FIG. 3.

In a specific embodiment, the main body portion 10 is provided with a second ring slot 40 configured to accommodate a card 200; and the card bag cover plate 31 is matched with the second ring slot 40.

In a specific embodiment, a second buckle 311 is arranged at one end of the card bag cover plate 31, and the other end of the card bag cover plate is connected to the second connecting assembly 32. A second buckle slot 41 matched with the second buckle 311 is provided on the second ring slot 40.

In a specific embodiment, the structure of the first connecting assembly 32 is similar to that of the first connecting assembly 22, and includes a first hinge 221, a second hinge 222 hinged to the first hinge 221, and two needle portions, each of which is provided with a texture at one end; the first hinge 221 is provided with a first threading portion 2211; the second hinge 222 is provided with a second threading portion 2221 matched with the first hinge 221; and gears are arranged on the first threading portion 2211 and the second threading portion 2221. One of the first hinge 221 and the second hinge 222 is connected to the main body portion 10; and the other one is connected to the card bag cover plate 31.

In a specific embodiment, the second connecting assembly 30 further includes a limiting sleeve 223, namely, a rubber sleeve 223; the limiting sleeve 223 is arranged in the first threading portion 2211 or the second threading portion 2221 in a penetrating manner to connect the other ends of the two needle portions. As shown in the figures of the present disclosure, arranging the limiting sleeve 223 in the first threading portion 2211 is taken as an example.

In a specific embodiment, a material of the first hinge 221 and the second hinge 222 is zinc alloy.

Figure 11:
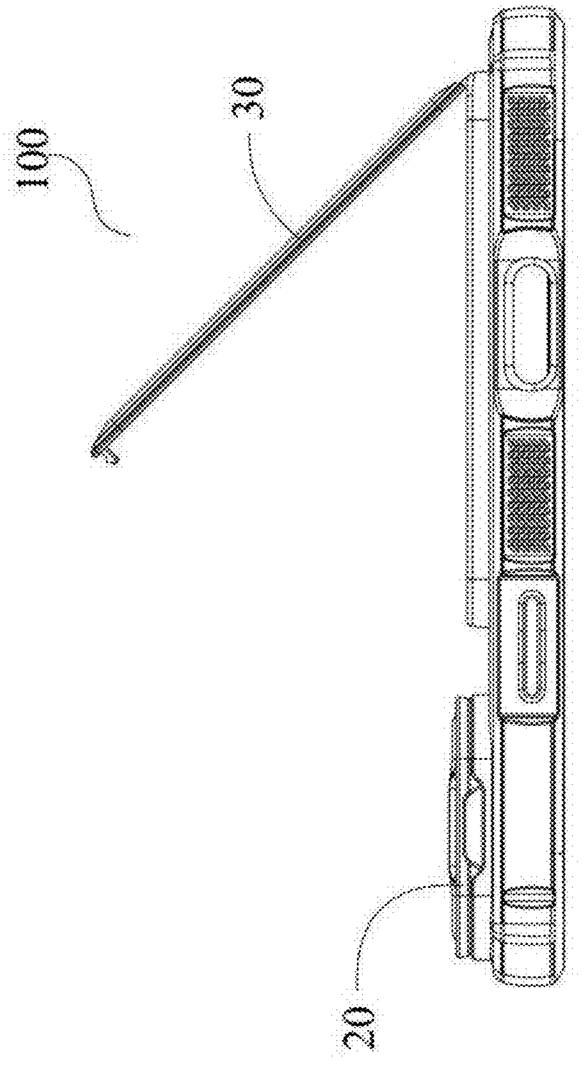
FIG. 11 is a front view of a state where the card bag cover plate is opened and used as a mobile phone holder in FIG. 3.
Figure 12:
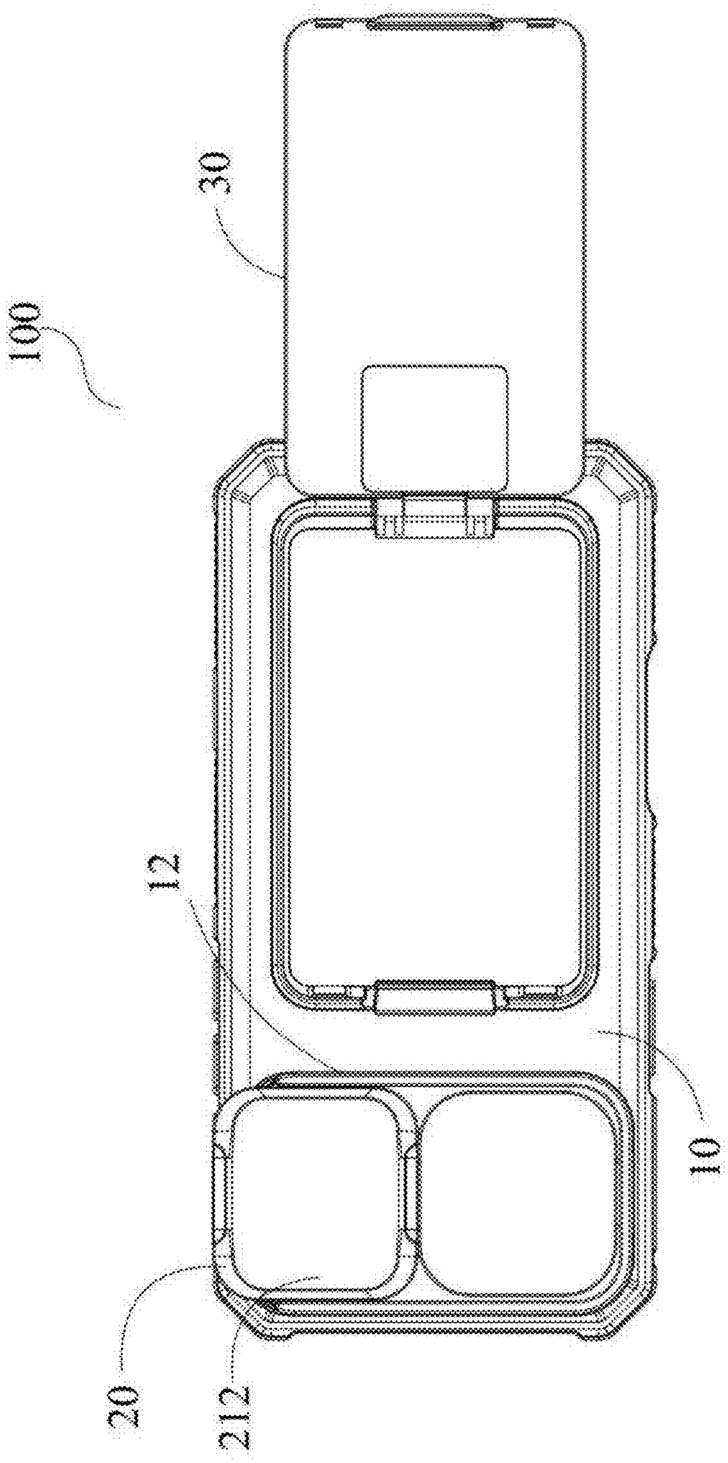
FIG. 12 is a front view of a state where the card bag cover plate is opened 180° in FIG. 3.
Figure 13:
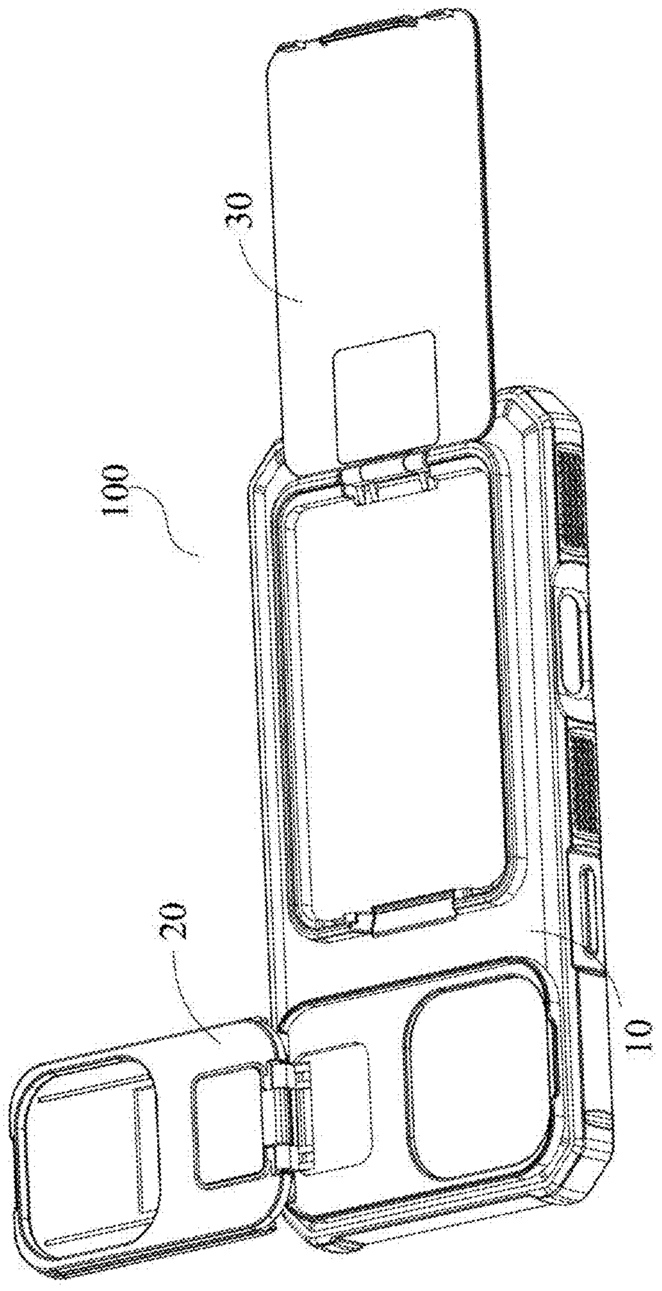
FIG. 13 is a front view of a state where both the camera holder assembly and the card bag cover plate are opened 180° in FIG. 3.

Referring to FIG. 10 to FIG. 13, FIG. 10 is a front view of an embodiment of a state where the card bag cover plate is opened and used as a mobile phone holder in FIG. 3; FIG. 11 is a front view of a state where the card bag cover plate is opened and used as a mobile phone holder in FIG. 3; FIG. 12 is a front view of a state where the card bag cover plate is opened 180° in FIG. 3; and FIG. 13 is a front view of a state where both the camera holder assembly and the card bag cover plate are opened 180° in FIG. 3.

In a specific embodiment, when the main body portion 10 is a mobile phone shell, the combination of the second ring slot 40 and the card bag cover plate 31 forms a reserved credit card slot, which can be used as a card bag to hold the card 200 (for example, in this embodiment, three cards can be held). Similarly, the card bag cover plate 31 can also stand upright as a holder and be extended 180° to serve as a selfie handle. Thus, when the selfie handle is not in use, the selfie handle can be closed at any time, without occupying a space, and is convenient to use. This product is provided with the card slot, so that it is more convenient to hold a credit card, and the cost for a card bag is saved. The structure of the second connecting assembly 32 is the same as that of the first connecting assembly 22, and the same parts will not be elaborated. A difference is that one of the first hinge 221 and the second hinge 222 is connected to the main body portion 10, and the other one is connected to the card bag cover plate 31.

Referring to FIG. 15, FIG. 15 is a front view of a state where both the camera holder assembly and the card bag cover plate are opened 180° in FIG. 3. In a specific embodiment, the camera holder assembly 21 and the card bag cover plate 31 can be opened 180° simultaneously for use.

The present disclosure provides a multifunctional mobile terminal shell. The shell includes a main body portion that is matched with one surface of a mobile terminal provided with a camera; a first holder assembly, arranged at one end of the main body portion and including a camera holder assembly and a first connecting assembly arranged at one end of the camera holder assembly, wherein the first connecting assembly is arranged on the main body portion and is hinged to the camera holder assembly; and a second holder assembly, spaced apart from the first holder assembly and including a card bag cover plate and a second connecting assembly arranged at one end of the card bag cover plate, wherein the second connecting assembly is arranged on the main body portion and is hinged to the card bag cover plate. By the arrangement of the first holder assembly and the second holder assembly on the main body portion of the shell placed at the back of a mobile terminal, adjusting an angle between the camera holder assembly and/or the card bag cover plate and the main body portion can achieve a supporting effect of a mobile phone holder. A force-bearing area is large, and there can be two supporting points, so that the center of gravity of the mobile terminal will not shift, and the supporting force is more sufficient, which greatly enhances the user experience.

The above describes only the implementations of the present disclosure and does not limit the patent scope of the present disclosure. Any equivalent structure or equivalent process transformation made using the specification and contents of accompanying drawings of the present disclosure, or directly or indirectly applied in other related technical fields, are equally included in the scope of patent protection of the present disclosure.

What is claimed is:

1. A multifunctional mobile terminal shell, wherein the shell comprises:

a main body portion, matched with one surface of the mobile terminal provided with a camera;

a first holder assembly, arranged at one end of the main body portion and comprising a camera holder assembly and a first connecting assembly arranged at one end of the camera holder assembly, wherein the first connecting assembly is arranged on the main body portion and is hinged to the camera holder assembly; and a second holder assembly, spaced apart from the first holder assembly and comprising a card bag cover plate and a second connecting assembly arranged at one end of the card bag cover plate, wherein the second connecting assembly is arranged on the main body portion and is hinged to the card bag cover plate, wherein the camera holder assembly comprises a first cover plate, a second cover plate, and sliding rails;

one end of the first cover plate is connected to the first connecting assembly;

the first cover plate is provided with a first opening matched with the camera of the mobile terminal;

the sliding rails are arranged at an edge of one side of the first cover plate facing away from the main body portion;

sliding blocks matched with the sliding rails are arranged at two ends of the second cover plate; and the second cover plate is matched with the first opening, wherein the first connecting assembly comprises a first hinge, a second hinge hinged to the first hinge, and two needle portions, each of which is provided with a texture at one end;

the first hinge is provided with a first threading portion;

the second hinge is provided with a second threading portion matched with the first hinge;

gears are arranged on the first threading portion and the second threading portion;

one of the first hinge and the second hinge is connected to the main body portion; and the other one of the first hinge and the second hinge is connected to the first cover plate, wherein the main body portion is provided with a second ring slot configured to accommodate a card; and the card bag cover plate is matched with the second ring slot, wherein the second connecting assembly comprises a third hinge, a fourth hinge hinged to the third hinge, and two needle portions, each of which is provided with a texture at one end;

the third hinge is provided with a third threading portion;

the fourth hinge is provided with a fourth threading portion matched with the third hinge;

gears are arranged on the third threading portion and the fourth threading portion;

one of the third hinge and the fourth hinge is connected to the main body portion; and the other one of the third hinge and the fourth hinge is connected to the card bag cover plate, wherein the second connecting assembly further comprises a limiting sleeve; the limiting sleeve is arranged in the third threading portion or the fourth threading portion in a penetrating manner to connect the other ends of the two needle portions of the second connecting assembly.

2. The multifunctional mobile terminal shell according to claim 1, wherein the main body portion is provided with a second opening and a first ring slot; the second opening is matched with the camera of the mobile terminal and the first opening; and the first ring slot is arranged outside the second opening and corresponds to the first cover plate.

3. The multifunctional mobile terminal shell according to claim 2, wherein the camera holder assembly comprises a group of sliding rails arranged at upper and lower edges of the first cover plate; the sliding blocks matched with the sliding rails are arranged at upper and lower ends of the second cover plate; the first connecting assembly is arranged on a right side of the first cover plate; a first buckle is arranged on a left side of the first cover plate; and the first ring slot is provided with a first buckle slot matched with the first buckle.

4. The multifunctional mobile terminal shell according to claim 1, wherein a second buckle is arranged at one end of the card bag cover plate, and the other end of the card bag cover plate is connected to the second connecting assembly;

and a second buckle slot matched with the second buckle is provided on the second ring slot.

5. The multifunctional mobile terminal shell according to claim 4, wherein a material of the first hinge and the second hinge is zinc alloy.

* * * * *